Oct. 5, 1965    P. E. MERCIER    3,209,780
DAMPING DEVICES
Filed Feb. 28, 1963

INVENTOR
PIERRE ERNEST MERCIER

BY *Glascock, Downing & Seebold*
ATTORNEY

United States Patent Office 3,209,780
Patented Oct. 5, 1965

3,209,780
DAMPING DEVICES
Pierre Ernest Mercier, Piscop, France, assignor to Sferma, Société Francaise d'Entretien et de Réparation du Matériel Aeronautique, a company of France
Filed Feb. 28, 1963, Ser. No. 261,776
Claims priority, application France, Mar. 2, 1962, 889,765
2 Claims. (Cl. 137—493)

This invention relates to dampers of the type embodying a constriction of variable section which opposes itself more or less to the flow of a fluid through a duct, in response to pressure differentials existing across said constriction.

In devices of this type heretofore employed, control over the fluid flow cross-section through the constriction is ensured either by the relative displacement of two component parts or by the deformation sustained by an appropriate element.

In many instances however, such as for example in the suspension systems used for certain moving bodies, it is possible to observe frequencies of oscillation of the fluid pressure differential across the constriction that may be much higher (three to five times as much, for example) than the lowest frequencies corresponding to the fundamental motions of the sprung masses. Under such conditions, moving parts that will ensure satisfactory damping at low frequencies ordinarily possess inertias and time constants tending to oppose the fluid flow rates associated with higher frequencies. Similar drawbacks are encountered in the case of deformable elements, particularly if they possess relatively high inertia. In all cases, this is reflected in the formation of shock waves and in a hammering of the elastic elements, where such exist, against the surfaces with which they come into periodic contact, so that the units suffer premature wear and cause unpleasant noise.

This invention has for its object to provide a device for controlling the flow cross-section of a fluid through a duct, in response to the pressure differentials prevailing across said device, that is free from the aforementioned drawbacks of the control devices used heretofore.

A device for controlling the flow section of a fluid according to this invention comprises a flap made of a flexible laminated material placed across the duct at the point where it is desired to provide the constriction. Along at least part of its edges, the flap is rigid with said duct, while the remaining free edges are positioned, in the absence of a pressure differential across the flap, opposite and adjacent the walls of said duct.

A device of this type, consisting basically of a flap made of some type of resilient laminated material, possesses an extremely low time constant, whereby the flap can follow high-frequency pressure variations without difficulty. In addition, since neither the sides nor the edge of the mobile portion of the flap are ever in contact with any fixed parts, and since the edge of the flap can attain close proximity to the duct wall but not touch such wall, the hammering effects liable to cause unpleasant noise and premature wear in the unit are obviated.

The fact that the edge of the flap is never in contact with a stationary part offers a very important additional advantage, to wit the ability of the device to control the fluid flow in either direction. Most known devices of this type utilize component parts of which some are assigned for decanting the fluid in one direction and the others for decanting the fluid in the opposite direction. An example in point is provided by combining elastic washers with an apertured seat against which the deformable edges of the washer are pressed in the inoperative position.

To enable such devices to be used for controlling a fluid in both directions, recourse has already been had to providing the same with compound seats in combination with two deformable washers respectively cooperating with the two seats. By virtue of the method of construction according to this invention, the free edge of the flap can be moved to either side and can thereby control the fluid flow cross-section in both directions of circulation of said fluid.

In a specific embodiment designed for a damping unit of the type comprising a cylinder filled with fluid and divided by said control system into two capacities within which prevail pressures that vary during operation of the unit, the control device hereinbefore referred to consists of at least one flexible washer rigidly clamped over the entire circumference of one of its edges, while the other edge is free and moves, in response to the pressure differentials across the two faces of the washer, along a wall of revolution rigid with the other edge of the washer, the meridians of said wall being so shaped that the liquid is provided with an annular flow cross-section that varies, in each direction and starting from the inoperative position of the washer wherein said flow cross-section is at a minimum (null for all practical purposes) as a function of the deformations sustained by the washer in obedience to any law capable of creating the desired damping effect in the flow of the liquid from one capacity to the other.

In accordance with a further particularity of the invention, a plurality of washers of identical thickness or of different thicknesses are stacked against one another and have the same diameter, or diameters which vary gradually from the central washer out to the external washers of the stack, and in that sense wherefore the radial widths of the washers gradually decrease from the central washer out to the external washers.

In a particular form of construction, the inner edge of the washer is rigidly clamped and its outer edge left free, while in an alternative form, the outer edge of the washer is rigidly clamped and its inner edge left free.

The description which follows of a number of possible embodiments of the invention, given with reference to the accompanying drawings which are filed by way of example only and not of limitation, will give a clear understanding of the invention.

In the drawings filed herewith:

Figure 1:
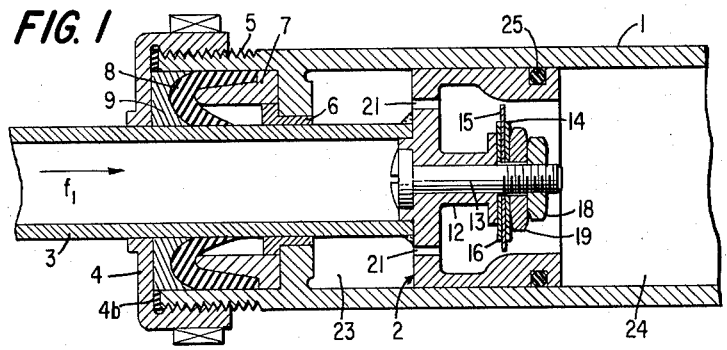
FIGURE 1 is a fragmentary vertical sectional view of a first embodiment of a control device for damping units.

Referring first to FIGURE 1, there is shown the main portion of the damping unit, comprising a cylinder 1 in which is displaceable a piston 2 rigid with a rod 3 which, in this specific example, is tubular.

The cylinder is filled with a fluid, which in this instance is a liquid, an example being oil, and is closed at one end by a plate (not shown) and at the other end by a cover 4 which screws onto a threaded portion 5 of said cylinder and includes a fixed seal 4b. A bronze bush 6, an annular supporting part 7, a seal 8 and a suitably shaped washer 9, or the like, ensure a leak proof arrangement between the cylinder and the piston rod 3 while at the same time permitting axial movement of the rod relative to the cylinder.

Piston 2 is provided with a hub portion 12 fitted with a central stud 13 over which are threaded a plurality of washers 14, 15, 16 (numbering three in the illustrated example) made of a flexible material, an example being a suitable metal.

In the example illustrated, the three washers are circular and of identical thickness, with external diameters decreasing from the central washer outwards. The washers are clamped at their centers against the piston hub 12 by means of a nut 18 screwed onto the threaded extremity of the stud 13, and an annular piece 19 being provided intermediate the nut and the first washer 14. That side of piece 19 which butts against washer 14 is convex and tangential to the surface of said washer near the inner edge thereof.

The outer edge of washer 15 is positioned very close to the inner surface of revolution of the piston 2, but does not touch such surface. The meridians of the piston surface are so shaped that an annular liquid flow cross-section be provided that varies, for both directions of flow of said liquid and starting from the inoperative position of the washer, i.e. from the position wherein the same is in the flat configuration and said flow cross-section is at a minimum, namely virtually null in most cases, as a function of the washer deformation in obedience to a suitable law capable of creating the desired damping effect in the flow of the liquid from one side of washer 15 to the other.

The face of the piston 2 is drilled with holes 21 to allow the liquid to flow between two capacities 23 and 24 determined by the piston in the cylinder.

The tightness of piston 2 in cylinder 1 is ensured by an appropriate seal, for instance by an O-ring 25 which seats in a corresponding annular groove provided in the outer cylindrical surface of piston 2.

In the specific example illustrated, the meridian of the inner surface of piston 2 has been shaped to leave an annular liquid flow cross-section between the edge of the washer and said surface that is much larger when the liquid flows from capacity 24 into capacity 23, namely when the piston rod moves in the direction of arrow $f1$ relative to cylinder 1, than when the liquid flows from capacity 23 into capacity 24 as the piston-rod moves back.

Since the washers can be as thin as desired and their free edges do not touch the piston wall, very fast response times can be obtained and hammering of the washer edges avoided, while at the same time ensuring silent operation of the unit.

By judiciously selecting the number of washers, their thicknesses and diameters, and the nature of the material of which they are made, any desired pattern of flexibility can be imparted to the deformable assembly, according to the type of damping required.

The use of multiple washers has the advantage that any vibration in the washer sustaining the deformations is damped. The main washer 15 could itself, if desired, consist of a multiplicity of thin washers of identical diameter.

A fluid flow control device according to this invention can be mounted not only on the mobile piston of a damper, or itself constitute such a piston, as shown in FIGURE 1, but also be mounted fixedly inside a housing provided for the purpose in a damping or suspension element, and in which case the device will be equipped with inactive sealing rings bearing against the walls of the housing.

This is a particularly useful form of utilization, as the unit forms a precise and relatively costly compound that can be introduced into a damping element of cruder design. This provides for great ease of assembly and interchangeability, qualities that are always sought after in the design of modern appliances.

The device according to the invention can be housed in a damper of any type whatsoever having inversely deformable cavities, examples being telescopic, cross connected-piston type, flap-type or like dampers. The device can alternatively be inserted in between the mechanically deformable space of a fluid-type suspension element the elastic mass of which can be constituted by the fluid itself or by a gas which is in direct contact therewith or separated therefrom by an envelope or diaphragm of low rigidity, or by a floating piston.

In all cases, the device is inserted in between two spaces occupied by a same fluid.

Figure 2:
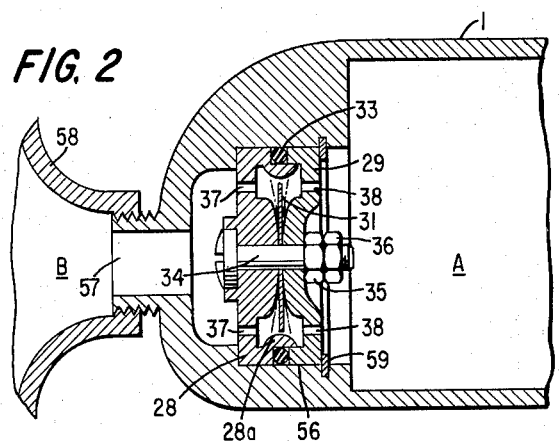
FIGURE 2 is a similar view of an alternative embodiment of the main portion of the device shown in FIGURE 1.

In the embodiment shown in FIGURE 2, the device is housed in a well 56 provided at the bottom of a cylinder 1 forming a first variable-capacity cavity. The well 56 communicates through a passageway 57 with the second cavity 58, the volume of which capacity is not necessarily variable and may enclose, for instance, the elastic mass utilized for the suspension element. The same fluid prevails in each of zones A and B and the device controls the flow from one zone to the other.

An inactive seal 33, bearing against the inner wall of the well, prevents the fluid from flowing otherwise than through the orifice controlled by deformable washer or spring disc valve 31, while a ring 59 retains the unit in its well yet allows the disassembly thereof.

In this specific embodiment, the unit consists of two half-shells 28, 29 and which hug the washer 31, which washer is clamped by its inner edge between the two convex faces opposite the two half-shells. The hole is firmly secured to stud 34 by a nut 35 associated with a locknut 36. The two half-shells 28 and 29 respectively are formed with holes 37 and 38 to allow the fluid to flow between zones A and B.

The laws governing the damping in each direction are determined by the shape of meridian 28a along the inner surface of the shell facing which is the outer edge of elastic washer 31. In the example under consideration, the shape of this meridian is symmetrical with respect to the plane of the washer when same is inoperative, so that the conditions of damping are identical in both directions.

Here again, instead of being in one piece, washer 31 can be made up of a stack of several washers of identical or different dimensions, such as shown at 14, 15, 16 in FIGURE 1, depending on the desired physical properties.

Figure 3:
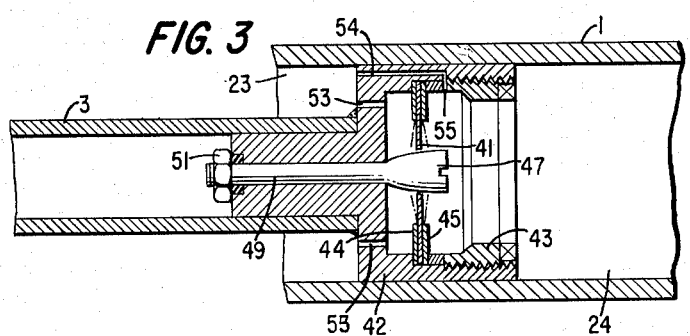
FIGURE 3 is a similar view of a further alternative embodiment of said device.

Reference is now had to FIGURE 3, in which the washer shown is no longer clamped by its inner edge as was the case in the embodiments of FIGURES 1 and 2, but by its outer edge which is clamped between an inner shoulder on piston 42 and the annular edge of a tubular nut 43 screwed into said piston.

In this particular example, the main washer 41 is reinforced by two lateral washers 44, 45 of identical outer diameter but smaller inner diameter, so as to provide different radial widths.

The inner edge of washer 41 is positioned immediately adjacent the outer surface of an olive-shaped knob 47 which is rigid with the outer edge of the washers and which to this end is formed on one extremity of a rod 49 threaded into an axial bore of piston 42 and secured therein by a nut 51 screwed onto that threaded end of rod 49 which is remote from knob 47.

The meridian outline of knob 47 is appropriately shaped to allow for varying the annular liquid flow cross-section between the inner edge of washer 41 and the surface of said knob in terms of the pressure differential prevailing across said washer when the unit is operating. Holes 53 are provided in the face of piston 42 to provide communication between the cylinder capacities 23 and 24.

In the example illustrated, the meridian outline of knob 47 is asymmetrical in relation to the plane of washer 41 when same is in its inoperative position, thereby providing for different damping laws according to the direction of flow of the liquid.

In this example, piston 42 is additionally provided with an auxiliary longitudinal passageway 54 which communicates with a radial passageway 55, in such manner that the two passageways jointly provide port means for capacity 23, on the one hand, and for capacity 24 on the other. This device represents an example of a fixed jet designed to provide moderate damping of the flow oscillations, upon which oscillations are superimposed the rapid oscillations that are smoothly damped by the system consisting of elastic washer 41 and knob 47.

Although a number of embodiments of the invention have been described and illustrated, it will be obvious to those skilled in the art that various changes, substitutions of elements and arrangements of parts may be made without departing from the spirit and scope of the invention. By way of example, although shapes of revolution have been given to the operative edges of the washers and to the surfaces with which they cooperate to determine the fluid flow cross-section, it will be manifest that any other convenient shape may be chosen.

What is claimed is:

1. A valve device for controlling the fluid flow through a passageway, comprising two flanged members extending transversely of the passageway with their flanges directed towards each other so as to leave an axial space therebetween, the inner face of each flanged member having a convex central portion surrounded by a flat annular portion provided with a plurality of angularly spaced fluid ports, one of said flanges having a cylindrical skirt portion the outer diameter of which is smaller than the inner diameter of the other flange and said skirt portion being partly engaged in said other flange so as to define with said inner faces of the flanged members an inner annular chamber and with the mutually facing end surfaces of said flanges and said passageway an outer annular chamber, a sealing ring in said outer chamber, and a spring disc valve having a central portion clamped between said convex portions of the flanged members and an outer portion extending transversely of said inner chamber with its outer edge spaced a small distance from said skirt portion, said convex portions of the flanged members constituting backing surfaces for said outer portion of the spring disc valve when such valve is caused to yield progressively in one or the other direction under the pressure of fluid flowing through the corresponding ports of said flanged members into said inner chamber.

2. The valve device as claimed in claim 1, in which the inner cylindrical wall of said skirt portion is convex, with said spring disc valve lying in a plane corresponding to the smallest inner diameter of said convex wall.

References Cited by the Examiner

UNITED STATES PATENTS

| | | | |
|---|---|---|---|
| 920,251 | 5/09 | Blankenship et al. | 188—96 |
| 2,481,088 | 9/49 | Cuskie | 137—525 X |
| 2,743,737 | 5/56 | Textor | 137—493 |
| 2,821,268 | 1/58 | Bourcier De Carbon | 188—88 |
| 2,827,283 | 3/58 | Browne et al. | 137—493 X |
| 2,941,544 | 6/60 | Peras | 188—100 |
| 3,070,191 | 12/62 | Allinquant | 188—100 X |

FOREIGN PATENTS

| | | |
|---|---|---|
| 838,403 | 5/52 | Germany. |
| 857,514 | 9/60 | Great Britain. |
| 1,077,606 | 11/54 | France. |

ARTHUR L. LA POINT, *Primary Examiner.*